United States Patent
Ginsburg et al.

(10) Patent No.: US 6,595,856 B1
(45) Date of Patent: Jul. 22, 2003

(54) ELECTRONIC SECURITY TECHNIQUE FOR GAMING SOFTWARE

(75) Inventors: Alec Ginsburg, Las Vegas, NV (US); Darin T. Gifford, Las Vegas, NV (US); Robert J. Piechowiak, Las Vegas, NV (US)

(73) Assignee: Sigma Game, Inc., Las Vegas, NV (US)

( * ) Notice: Subject to any disclaimer, the term of this patent is extended or adjusted under 35 U.S.C. 154(b) by 0 days.

(21) Appl. No.: 09/476,915

(22) Filed: Jan. 4, 2000

(51) Int. Cl.[7] .............................................. G06F 17/00

(52) U.S. Cl. ...................................................... 463/29

(58) Field of Search ............................ 463/40, 41, 42, 463/29, 16, 22; 380/24, 4, 9, 23, 30, 49, 50, 59

(56) References Cited

U.S. PATENT DOCUMENTS

| | | | | |
|---|---|---|---|---|
| 5,643,086 A | * | 7/1997 | Alcorn et al. .................. | 463/29 |
| 5,668,945 A | * | 9/1997 | Ohba et al. ................... | 395/186 |
| 5,768,382 A | * | 6/1998 | Schneier et al. .............. | 380/23 |
| 6,071,190 A |   | 6/2000 | Weiss et al. | |
| 6,099,408 A | * | 8/2000 | Schneier et al. .............. | 463/29 |
| 6,106,396 A | * | 8/2000 | Alcorn et al. .................. | 463/29 |

FOREIGN PATENT DOCUMENTS

WO    WO 99/65579    * 12/1999    ............. A63F/5/04

OTHER PUBLICATIONS

Daemen, Joan and Clapp, Craig. "Fast Hashing and Stream Encryption with Panama". [online], Jul. 14, 1998. [Retrieved on Nov. 9, 2000]. retrieved from the Internet <:<URL:http://standard.pictel.com/ftp/research/security/panama.pdf>.*

Bruce Schneier; Applied Cryptography Second Edition: protocols, algorithms, and source code in C. *One Way Hash Functions*, Chapter 18, pp. 429–459.

Federal Information Processing Standards Publication 113; *Computer Data Authentication*, May 30, 1985; pp. 1–7.

(List continued on next page.)

*Primary Examiner*—Michael O'Neill
*Assistant Examiner*—Julie Brocketti
(74) *Attorney, Agent, or Firm*—McDermott, Will & Emery

(57) ABSTRACT

A method and apparatus for securing the game program software and related data files used by a gaming device and for authenticating such files during game startup and play. In one embodiment of the present invention, a verification code is generated by the manufacturer for each software file and data file used by the game. The verification codes are stored in a non-volatile, tamper-proof, read-only memory device, which is (in some embodiments) securely attached to the gaming device. On some or every download of the game software and/or related data files into the gaming device, commencement of a game, or on the occurrence of certain pre-defined events, the stored verification code is used to validate the game software and data files. In some embodiments, verification is performed automatically on a periodic basis without operator or player action. Verification consists of calculating a live verification code for some or all of the software and data files present in the alterable random access memory using the same method chosen to create the stored verification code. In some embodiments of the present invention, the verification code is the result of a hash function of trusted copies of each software and related data file. If the live code matches the stored code for every suspect file, then operation and play proceeds normally. If, however, one or more codes do not match, an error condition is declared, operation is halted, and notification of the error condition follows.

36 Claims, 7 Drawing Sheets

OTHER PUBLICATIONS

Federal Information Processing Standards Publication 180–1; *Secure Hash Standard,* Apr. 17, 1995 pp. 1–17.

J. Daemen, C.S.K. Clapp; *"Fast Hashing and Stream Encryption With Panama"*; Paris, France, Mar. 1998; Fast Software Encryption (Ed. S. Vaudenay), LNCS 1372, Springer–Verlag, 1998.

J. Daeman and Craig Clapp; *"The Panama Cryptographic Function"*; Dr. Dobbs Journal, Dec. 1998, pp. 42, 44, 46, 48 and 50.

Federal Information Processing Standards Publication 180; Secure Hash Standard, May 11, 1993; pp. 1–20.

William Stallings; SHA: The Secure Hash Algorithm: putting message digests to work; computer encryption programming; Dr. Dobb's Journal of Software Tools; Apr., 1994; p. 32.

H. Newton; Newton's Telecom Dictionary, (15th ed. 1999); back cover page, title page, and p. 374.

* cited by examiner

ELECTRONIC SECURITY TECHNIQUE FOR GAMING SOFTWARE

BACKGROUND OF THE INVENTION

1. Field of the Invention

This invention relates to electronic gaming devices and in particular security measures in such devices.

2. Description of the Related Art

Electronic gaming devices, as used in casinos and similar gaming establishments, are common in the gaming industry. In particular, gaming devices employing video displays, microprocessor control, game software programs, and related data files describing and defining the game or games played are well-known in the art.

One problem seen in the industry arises from the need to ensure that games have not been tampered with or modified so as to unfairly affect payouts. In current computer- or microprocessor-based gaming devices (machines), all game software programs and related data files (such as graphics and paytables) are stored in read-only memory (ROM) physically located inside the device's cabinet. The game software is thus under the physical control of the gaming establishment or casino using the device. The ROM is either soldered into the circuit board of the game or mounted in a socket with a tamper-proof device such as a security tape. These precautions are mandated in some locations by gaming regulators to prevent manipulation of the gaming program once installed in the machine.

With the comparatively recent advent of multimedia games, e.g., games employing sophisticated and complex sound, graphic, and video effects, the memory storage limitations of ROM devices has become a limitation. The latest multimedia games require many times more computer memory to hold the game program software and associated data files, such as special graphics, video, or sound files. The high cost, power consumption, and physical space required to install enough ROM in a gaming device to hold modern multimedia games has become an issue slowing the growth of these more appealing games.

Mass storage devices, such as local or networked disk, tape, and/or CD-ROM drives are known in the art for their ability to store such large multimedia games and related data files. Software and data files are loaded from the mass storage device into random access memory (RAM) within the gaming device by conventional means long known in the computer arts. However, RAM (by its very nature) is extremely easy to alter. Gaming regulators are reluctant to allow the use of RAM-based software and data storage systems without assurance that the game cannot be tampered with during play, either by the house or by a player so as to create an unfair game.

What is needed is a method of verifying and authenticating game program software and related data files upon loading into a gaming machine from a mass storage system, during play, and on the occurrence of certain events so that the game integrity is positively ensured at all times.

SUMMARY

Presently disclosed is a method and apparatus for securing the game software and related data files used by a casino gaming device and for authenticating such files during game startup and play. In one embodiment of the present invention, a verification code is generated by the manufacturer for each software file and data file used by the game. The verification codes are stored in a non-volatile, tamper-proof, read-only memory device securely attached to the gaming device. On some or every download of the game software and/or related data files into the gaming device, commencement of a game, or on the occurrence of certain pre-defined events, the stored verification code is used to validate the game software and data files. Additionally, in some embodiments verification is performed automatically on a periodic basis without operator or player action.

Verification consists of calculating a "live" verification code for some or all of the software and data files present in the alterable random access memory using the same method chosen to create the stored verification code described above. In some embodiments of the present invention, the verification code is the result of a hash function of trusted copies of each software and related data file. If the live code matches the stored code for each and every file in question, then operation and play proceeds normally. If, however, one or more codes do not match, an error condition is declared and operation is halted. Notification of the error condition follows according to means well-known in the art.

BRIEF DESCRIPTION OF THE DRAWINGS

The present disclosure may be better understood and its numerous features and advantages made apparent to those skilled in the art by referencing the accompanying drawings.

The use of the same reference symbols in different drawings indicates similar or identical items.

DETAILED DESCRIPTION

Introduction

Figure 1:
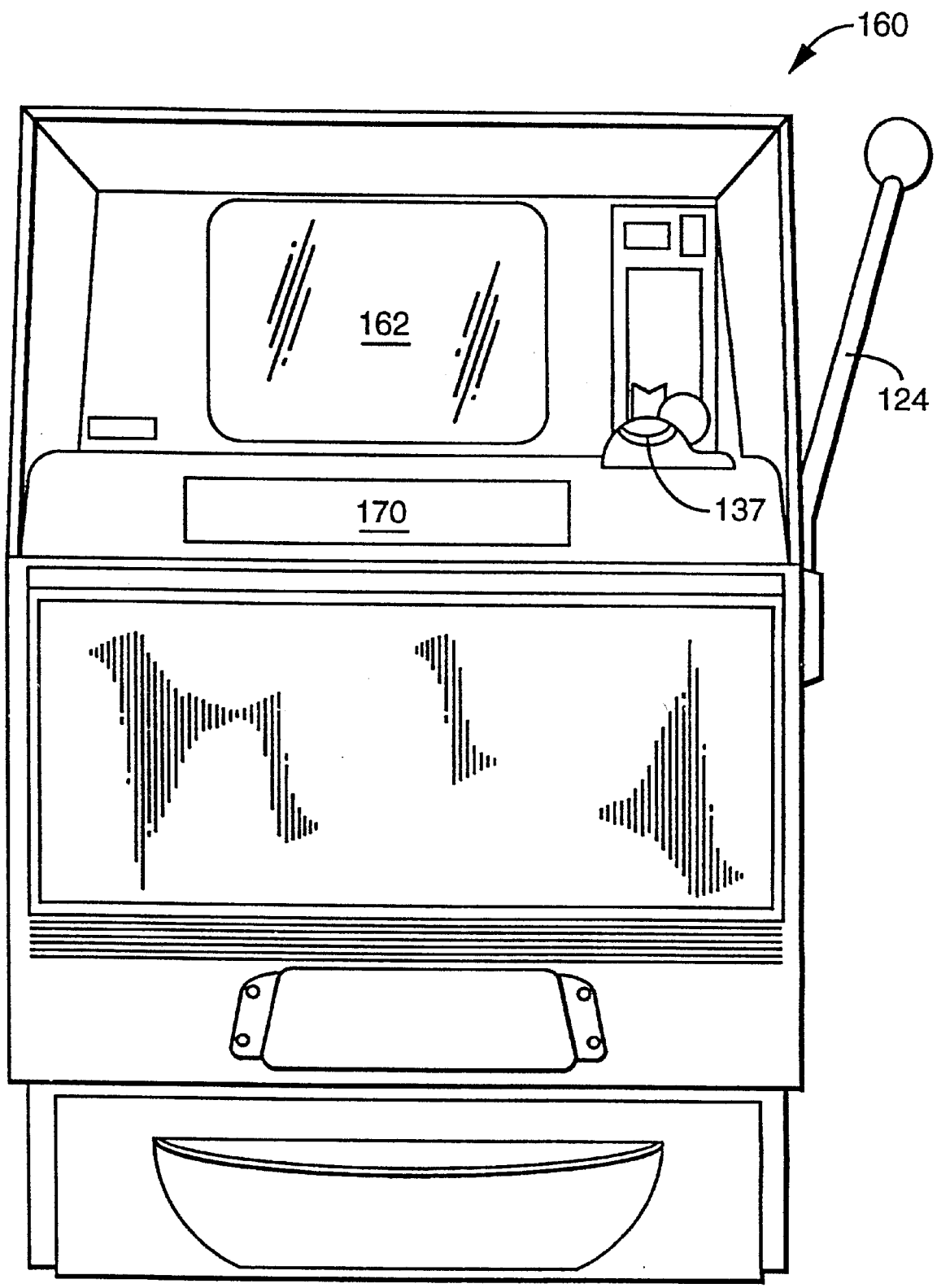
FIG. 1 is a front view of a prior art gaming device.
Figure 2:
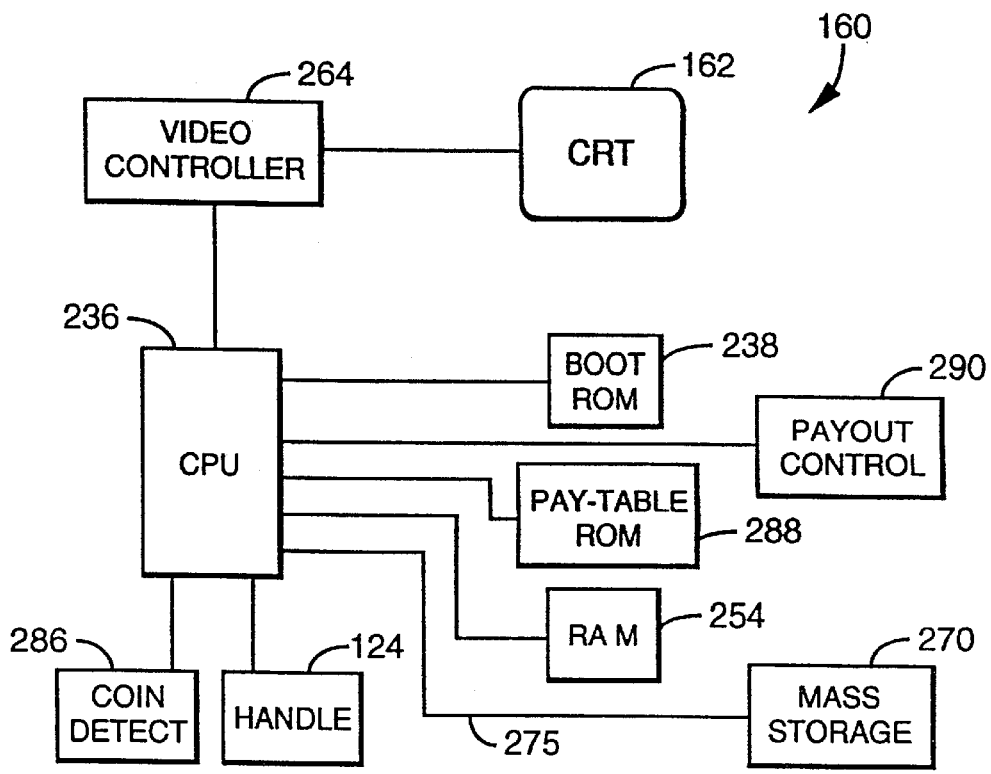
FIG. 2 is a high-level schematic of some of the internal components of a prior art gaming device.

FIG. 1 is a front view of a video gaming device 160 that houses the functional units of FIG. 2. Coin slot 137 provides a mechanism to deposit money or tokens. A control panel 170 provides a player interface for entering such information as the bet amount. Display 162 is typically a cathode ray tube (CRT) or similar computer display screen, such as the well-known LCD display. A touch screen (instead of or in addition to display 162) may also be used as a player input device. Pulling handle 124 is one well-known way of initiating play.

FIG. 2 illustrates some of the functional circuitry used in video gaming device 160 to display the video and visual portions of a multimedia game on display 162, here a CRT display. Other types of displays and additional functional circuitry may also be used. Functional units in FIGS. 1 and 2 labeled with the same numerals may be identical.

Boot ROM 238 is used by CPU 236 on game start-up to load game program software and related data files from mass storage 270 into RAM 254 by means well-known in the art. Mass storage 270 is connected to CPU 236 by data link 275. Data link 275 may be a direct, wired connection when mass storage 270 is co-located with CPU 236. Data link 275 may alternatively be a conventional remote data link such as a computer network connection when mass storage 270 is located apart from gaming device 160. Both configurations are known in the gaming machine art.

A video controller 264 controls CRT 162 and receives commands from CPU 236. One skilled in the art would understand the requirements for video controller 264 and CPU 236, since these devices would be generic to a wide variety of gaming devices such as slot machines. The video controller 264 receives codes from CPU 236 and converts these codes into the pixel control signals used by CRT 162 to produce the game display.

A conventional coin detector 286, pay-table ROM 288, and payout controller 290 (e.g., a hopper) are also shown.

An example of a video gaming apparatus using RAM and authentication of the gaming software can be found in U.S. Pat. No. 5,643,086 to Alcorn et al. (hereinafter Alcorn '086), incorporated herein by reference in its entirety.

Authentication Apparatus

Figure 3:
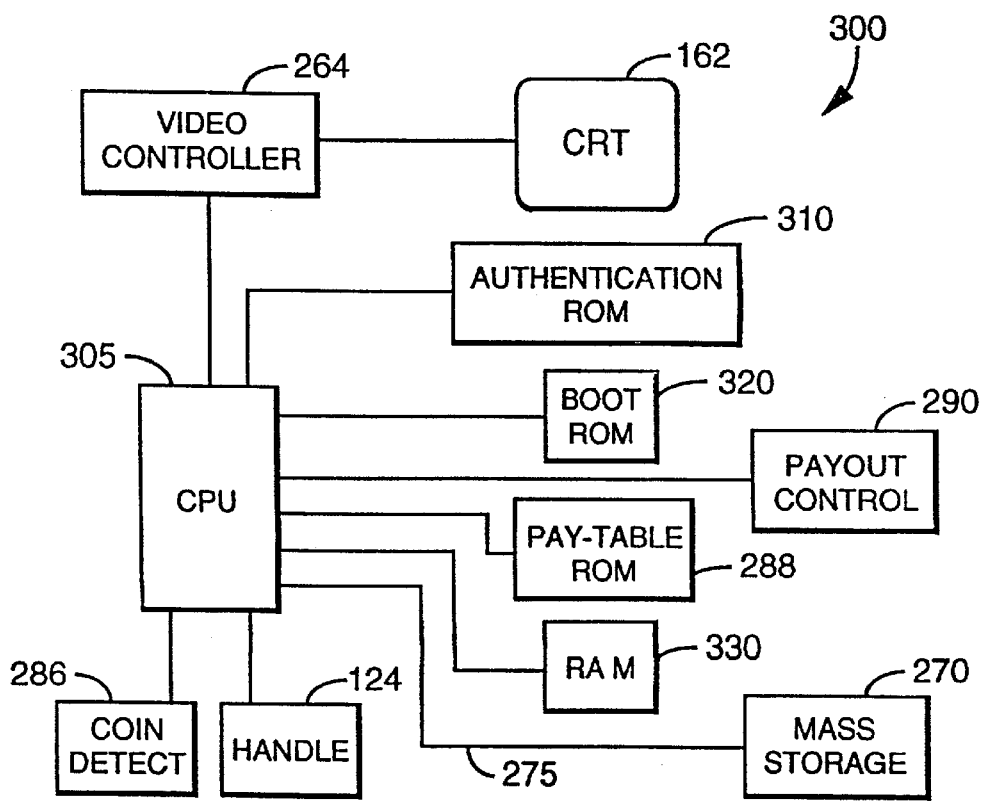
FIG. 3 is a high-level schematic of some of the internal components of a gaming device according to one embodiment of the present invention.

In one embodiment of the present invention, shown in FIG. 3, authentication ROM 310 is connected to CPU 305, along with boot ROM 320, RAM 330 and mass storage 270. Other aspects of the system are as described with reference to FIG. 2. Authentication ROM 310 is any unalterable memory device, such as a one-time use, electronically programmable ROM (PROM), presently known in the art. Although the term ROM is used, one of ordinary skill in the art will readily appreciate that other read-only memory devices of similar, static and not easily field-modifiable nature may be used.

A stored verification code is generated at the game manufacturer's factory using accurate and secure (or "trusted") copies of the software and data files designated for use in that game. As discussed below with reference to FIG. 4, the verification codes are stored in authentication ROM 310 by the manufacturer to provide the necessary reference identifier so that suspect files may be tested.

The trusted files are themselves stored by the manufacturer in mass storage device 270 or on any commonly-available mass storage media for use in a mass storage device. Mass storage device 270, whether a self-contained unit (e.g., the well-known Winchester hard disk device) or one employing the above-mentioned removable media, is installed in and distributed with the gaming devices. In one embodiment seen in the prior art, the trusted game files are written on a CD-ROM removable media and read by an appropriate CD-ROM reader in the gaming device. Alternately, as also known in the art, the mass storage device 270 or CD-ROM reader may be located remotely from and networked to the gaming device by data link 275.

CPU 305, using software stored in boot ROM 320, reads game software and data files from mass storage 270 over data link 275, placing images (copies) of those files in RAM 330 by conventional means. Authentication software, located in one embodiment of the present invention within boot ROM 320, computes a "live" verification code for each of the suspect files loaded into RAM 330. The live code is computed using the same method used to generate the stored verification code located in authentication ROM 310 (further described below). The authentication software may also be located in a secure, unalterable media elsewhere in apparatus 300, such as in the basic I/O system (BIOS) ROM (not shown) or in authentication ROM 310 itself.

The files read into RAM 330 are considered suspect because they have been loaded from mass storage unit 270 across data link 275 and may have been tampered with either while stored or while in transit.

The preparation process used to compute the verification code is further described by reference to FIG. 4. Trusted game software program and related data files 410 are hashed 420 to compute a verification code for each program and/or data file. (Hashing is further described below.) Although the step of hashing is recited, those skilled in the art will realize that digital signature and/or authentication processes other than hashing can be used. Accordingly, the invention is not limited to any particular type of digital signature or authentication process. Verification code 425 is then written into (stored in) authentication ROM 310 in step 430. Finally, authentication ROM 310 is securely installed in the gaming device in step 440, using (in some embodiments) security tape or other tamper-proof devices.

Referring back to FIG. 3, the live code is compared to the stored verification code contained in authentication ROM 310 by the authentication software running (in some embodiments) on CPU 305. If the live code matches (i.e., is identical to) the stored verification code for each and every file loaded into RAM 330, then use of game software and other related files is allowed. If one or more codes do not match, an error condition is declared within CPU 305 and further game operation is halted. Additionally, in some embodiments of the present invention, an alert system of a type well-known in the gaming industry (such as a flashing light or a computer message transmitted to an operator) is triggered to call for machine service.

Alternatively, the authentication software may operate on a separate processor, either within the gaming device or external to it and connected by a network or other data connection.

Verification and Live Code Generation

In some embodiments of the present invention, the verification code and the live code are both the result of a hash (or message digest) function of the contents of each software program or data file. Hash functions are well-known in the art; see, for example, H. Newton, *Newton's Telecom Dictionary* 374 (15th ed., 1999):

Hashing: A cryptographic term for a small mathematical summary or digest of an original clear-text data file or message. A hash algorithm ensures data integrity through the detection of changes to the data either by communications errors occurring in transit, or by tampering. In combination, hashing and the use of a digital signature (digital certificate) prevent the forging of an altered message.

Hashing is also further described in Alcorn '086. Many different hash functions are known.

The Panama Hash Apparatus

In one embodiment of the present invention, the hash function employed is known as the Panama hash function, described in J. Daemen and C. Clapp, "Fast Hashing and Stream Encryption," *Fast Software Encryption* 60–74 (S. Vaudenay, ed.), LNCS 1372 (1998), (Daemen & Clapp I) and in J. Daemen and C. Clapp, "The Panama Cryptographic Function," *Dr. Dobb's Journal* (December 1998), pp. 42–49 (Daemen & Clapp II), incorporated herein by reference in their entireties.

Panama is based on a finite state machine with a 544-bit state and 8192-bit buffer. The state and buffer can be updated by performing an iteration. There are two modes for the iteration function:

A Push iteration injects an input and generates no output.

A Pull iteration takes no input and generates an output. (A blank Pull iteration is a Pull iteration in which the output is discarded.)

The hashing state is updated by a parallel nonlinear transformation. The buffer operates as a linear feedback shift register, similar to that applied in the compression function of The Secure Hash Algorithm (SHA). Further details are provided in William Stallings, "SHA: The Secure Hash Algorithm," *Dr. Dobbs's Journal* (April 1994); and *Secure Hash Standard,* Federal Information Processing Standard, NIST Publication 180, (May 1993), both incorporated herein by reference in their entireties. The updating transformation of the state has high diffusion and distributed nonlinearity. Its design is aimed at providing high nonlinearity and fast diffusion for multiple iterations. This is realized by the combination of four distinct transformations, each with its specific contribution—one for nonlinearity, one for bit dispersion, one for diffusion, and one for injection of buffer and input bits.

The buffer behaves as a linear feedback shift register that ensures that input bits are injected into the state over a wide interval of iterations. In Push mode, the input to the shift register is formed by the external input; in Pull mode, by part of the state. The Panama hash function is defined as performing Push iterations with message blocks as input. If all message blocks have been injected, a number of blank Pull iterations allow the last message blocks to be diffused into the buffer and state. This is followed by a final Pull iteration to retrieve the hash result.

The state is denoted by $a[17]$ and consists of 17 (32-bit) words $a[0]$ to $a[16]$. The buffer $b[32][8]$ is a linear feedback shift register with 32 stages, each consisting of eight 32-bit words. The three possible modes for the Panama module are:

Reset mode, in which the state and buffer are set to 0.

Push mode, in which an eight-word input $input[8]$ is applied and there is no output.

Pull mode, in which there is no input and an eight-word output $z[8]$ is delivered.

The buffer update operation is defined as follows: Let $b[32][8]$ be the contents of the buffer before the update operation and $B[32][8]$ after it. In Push mode in Example 1(a), $q[8]$ is the input block $inp[8]$; in Pull mode, it is part of the state $a[17]$, with its eight component words given by Example 1(b).

EXAMPLE 1

Pseudocode Illustrating Buffer Update Operation
(a) Push mode; (b) Pull mode; (c) common part (a)

```
for (i = 0; i < 8; i++)
        {q[i] = a[i = 1];}
```

(b)

```
for (i = 0; i < 8; i++)
        {q[i] = input[i];}
```

(c)

```
for
    (j = 1; j < 25; j++)
    {for (i = 0; i < 8; i++) B[j][i] = b[j − 1][i];}
for (i = 0; i < 8; i++) {B[0][i] = b[31][i] ^ q[i];}
```

-continued

```
for
    (j = 26; j < 32; j++)
    {for (i = 0; i < 8; i++) B[j][i] = b[j − 1][i];}
for (i = 0; i < 8; i++){B[25][i] = b[24][i] ^ b[31][(i + 2) % 8
];}
```

The state updating transformation is defined as follows: Let $a[17]$ be the state before applying the transformation and $A[17]$ after it. In Example 2(a), <<< denotes cyclic shift to the left. In Push mode, $p[8]$ corresponds to the input $inp[8]$, while in Pull mode it is part of the buffer $b[32][8]$ with its eight component words given by Example 2(b). In Pull mode, the output $z[8]$ consists of eight words of the state, prior to the application of the update operation; see Example 2(c).

EXAMPLE 2

State Updating Transformation
(a) Push mode; (b) Pull mode; (c) common part; (d) output from Pull mode:

(a)

```
for (i = 0; i < 8; i++)
        {p[i] = input[i];}
```

(b)

```
for (i = 0; i < 8; i++)
        {p[i] = b[4][i];}
```

(c)

```
for (i = 0; i < 17; i++)
        {r[i] = a[i] ^ (a[(i + 1) % 17] |
    ~a[(i + 2) % 17]);}
for (i = 0; i < 17; i++) {s[i] = r[(7*i) % 17] <<< ((i*(i + 1)/2
) % 32);}
for (i = 0; i < 17; i++) {t[i] = s[i] ^ s[(i + 1) % 17] ^
    s[(i + 4) % 17];}
A[0] =
    t[0] ^ 0x00000001;
for (i = 0; i < 8; i++) {A[(i + 1) % 17] = t[(i + 1) % 17] ^ p[i];}
for (i = 0; i < 8; i++) {A[(i + 9) % 17] = t[(i + 1) % 17] ^
    b[16][i];}
```

(d)

```
for (i = 0; i < 8; i++)
        {z[i] = a[i];}
```

Figure 7A:
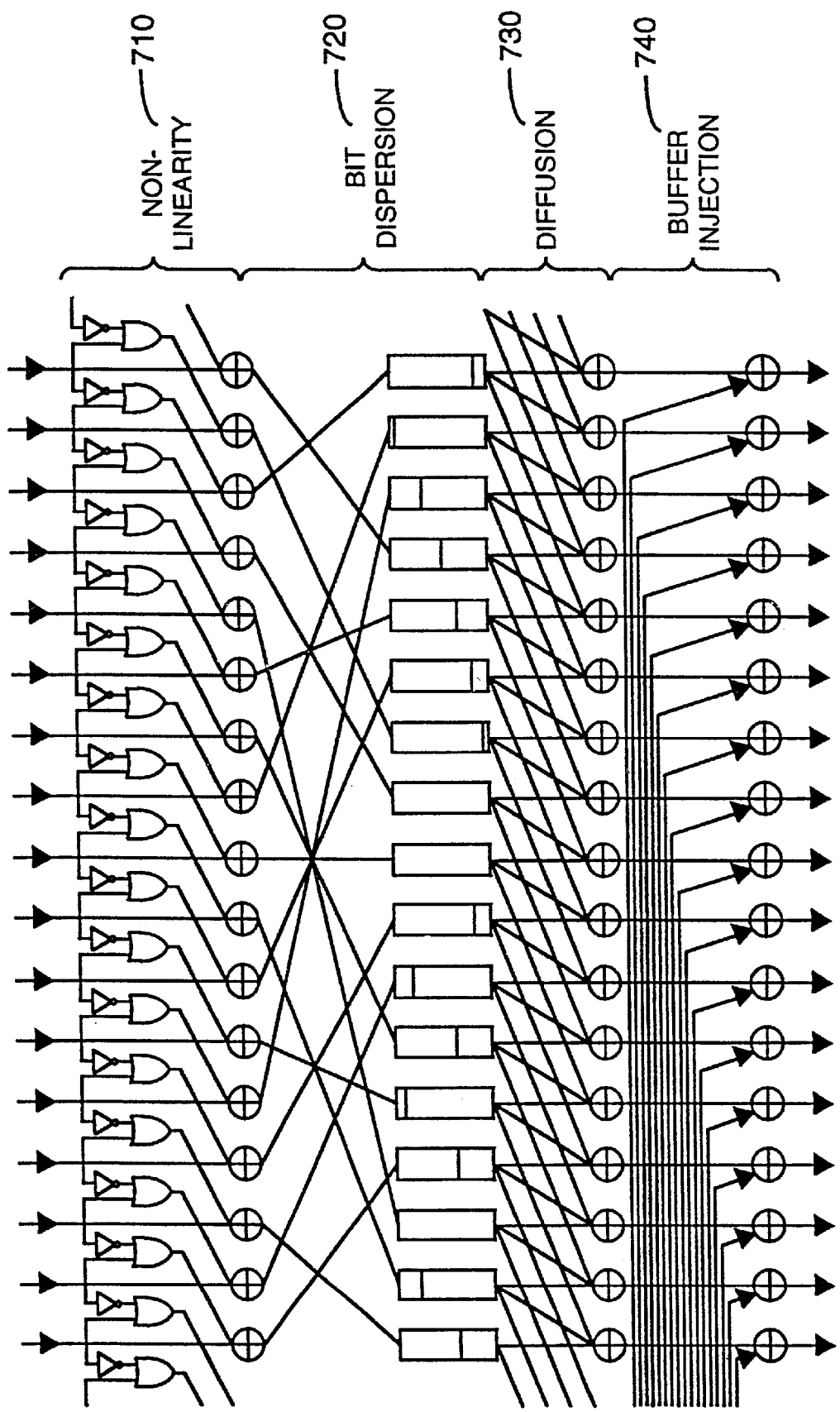
FIG. 7A is a high-level block diagram of the apparatus implementing the four steps of the state updating transformation, according to one embodiment of the present invention.
Figure 7B:
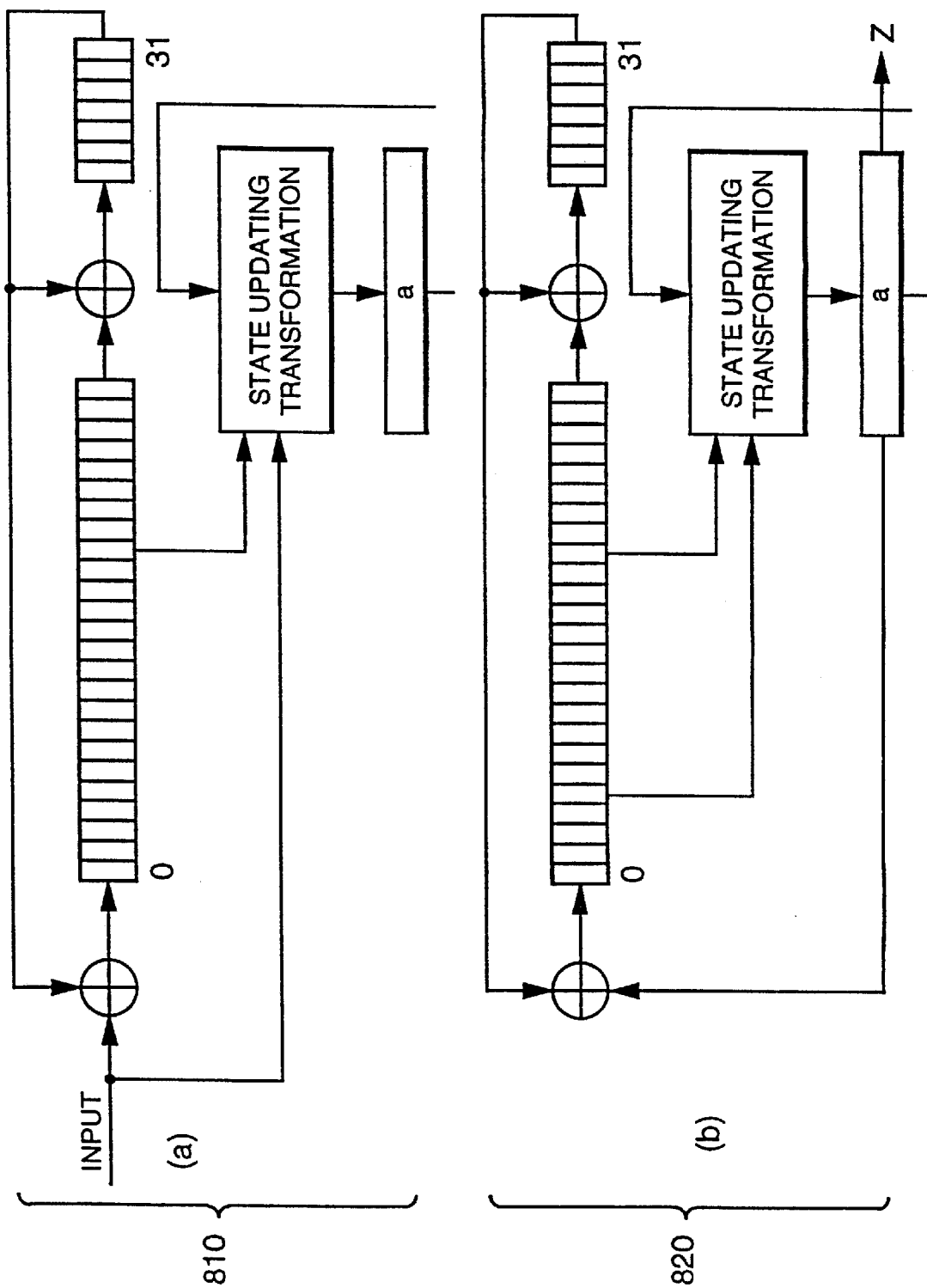
FIG. 7B is a high-level block diagram of the apparatus implementing the Push and Pull modes of the Panama hash, according to one embodiment of the present invention.

FIG. 7A illustrates the four steps 710, 720, 730, and 740 of the state updating transformation, and FIG. 7B shows the Push 810 and Pull 820 modes of the Panama module.

The Panama Hash Function

The Panama hash function maps a message of arbitrary length M to a hash result of 256 bits. The Panama hash function is executed in two phases:

Padding: M is converted into a string M' with a length that is a multiple of 256 by appending a single 1, followed by a number d of 0-bits with $0 \leq d < 256$.

Iteration: the input sequence $M' = m^1 m^2 \ldots m^v$ is loaded into the Panama module as per the following table:

| Time Step t | Mode | Input | Output |
| --- | --- | --- | --- |
| 0 | Reset | — | — |
| 1, . . . , V | Push | $m^t$ | — |
| V + 1, . . . , V + 32 | Pull | — | — |
| V + 33 | Pull | — | h |

After all input blocks have been loaded, an additional 32 blank Pull iterations are performed; then the Hash result is returned. The number of Push and Pull iterations to hash a V-block input sequence is V+33.

Panama can be turned into a secure MAC by simply including a secret key in the message input.

Panama Hash Implementation Aspects

Panama's heavy reliance on bit-wise logical operations make it well-suited to implementation on 8-, 16-, 32-, or 64-bit processors, except that its use of 32-bit rotations does somewhat favor 32-bit architectures.

On most processors the result of a simple operation, such as an addition or XOR, can be used in the subsequent cycle; these instructions are said to have a one-cycle latency. On modern high-performance processors, it is also common for shifts and rotates to be single-cycle instructions. However, reading from memory takes several cycles. Even when the data is in the CPU's local cache it commonly suffers a two- or three-cycle latency on modern, deeply pipelined processors.

The software critical path of Panama is through the state updating transformation, whose input is the output of the previous iteration. Each word of the state incurs seven single-cycle instructions: four XORs, one OR, one NOT, and one cyclic shift (except for the unrotated word). By merging the XOR operations of the diffusion and buffer injection layers, they can be implemented with a logic depth of two (rather than three). Hence, the critical path is just six cycles.

In addition to these (17×7)−1 logical operations, the state updating transformation entails a total of 16 reads (from buffer stages 4 and 16 for Pull, or input p and buffer stage 16 for Push). Updating the buffer is not on the software critical path and is most efficiently implemented as a circular buffer in memory with moving pointers used to create the appearance of a shift register. Its execution involves 16 reads, 16 XOR operations, and 16 writes (buffer stages 0 and 25), plus three or four instructions to update each of the pointers to the accessed stages for simulating the shift register, three pointers being needed for Push and four for Pull.

In Pull mode, an additional eight reads, eight XORs, and eight writes are necessary for encrypting the data buffer. Thus, ignoring for the moment the few extra instructions necessary for implementing the loop and maintaining pointers into the data buffers, we have a workload of 191 instructions for each iteration of Push and 218 for each Pull. This is equivalent to about six instructions per byte hashed, or 6.8 instructions per byte enciphered.

Authentication Method

The process by which the game software and related data files are each authenticated is described by reference to FIG. 5. As an initial step (described above), the game software and data files 505 are loaded into gaming device RAM 330 by reading mass storage media 270 in step 510. At this point, the loaded files are considered suspect because the mass storage 270 or communications link 275 may have been tampered with.

The actual authentication process 599 begins with step 520, where a live verification code is computed for each and every suspect file (i.e., for the game software program and for each data file accompanying it) just read into RAM. For the sake of clarity, the process of creating a live code for each file in RAM is represented by a single step, though one of ordinary skill in the art will appreciate that an iterative process is required to identify all files present and generate a live code for each.

Step 530 tests the live code for each suspect file against the corresponding stored code in authentication ROM 310. If each and every test passes, the process proceeds to attract/play mode 540 and waits until a specified event (Play Start, Doors Closed, time-out, etc. as described below) occurs. In attract/play mode, the game stands ready for a player to initiate a game through conventional means.

If even one live code fails to match the expected stored code in step 530, play is disabled 550, an error condition is declared 552, an alert signal is sent 554 (in some embodiments), and the game enters a "wait for operator reset" state 556.

The alert signal can be propagated in the gaming establishment by any of a number of means well-known in the gaming industry. A flashing light may be activated on the device itself, in addition to a special screen display indicating a malfunction and suspension of play. In networked games, an error alert message, of any level of specificity required, can be sent to a logging system or a human operator or operators, including security personnel.

Figure 4:
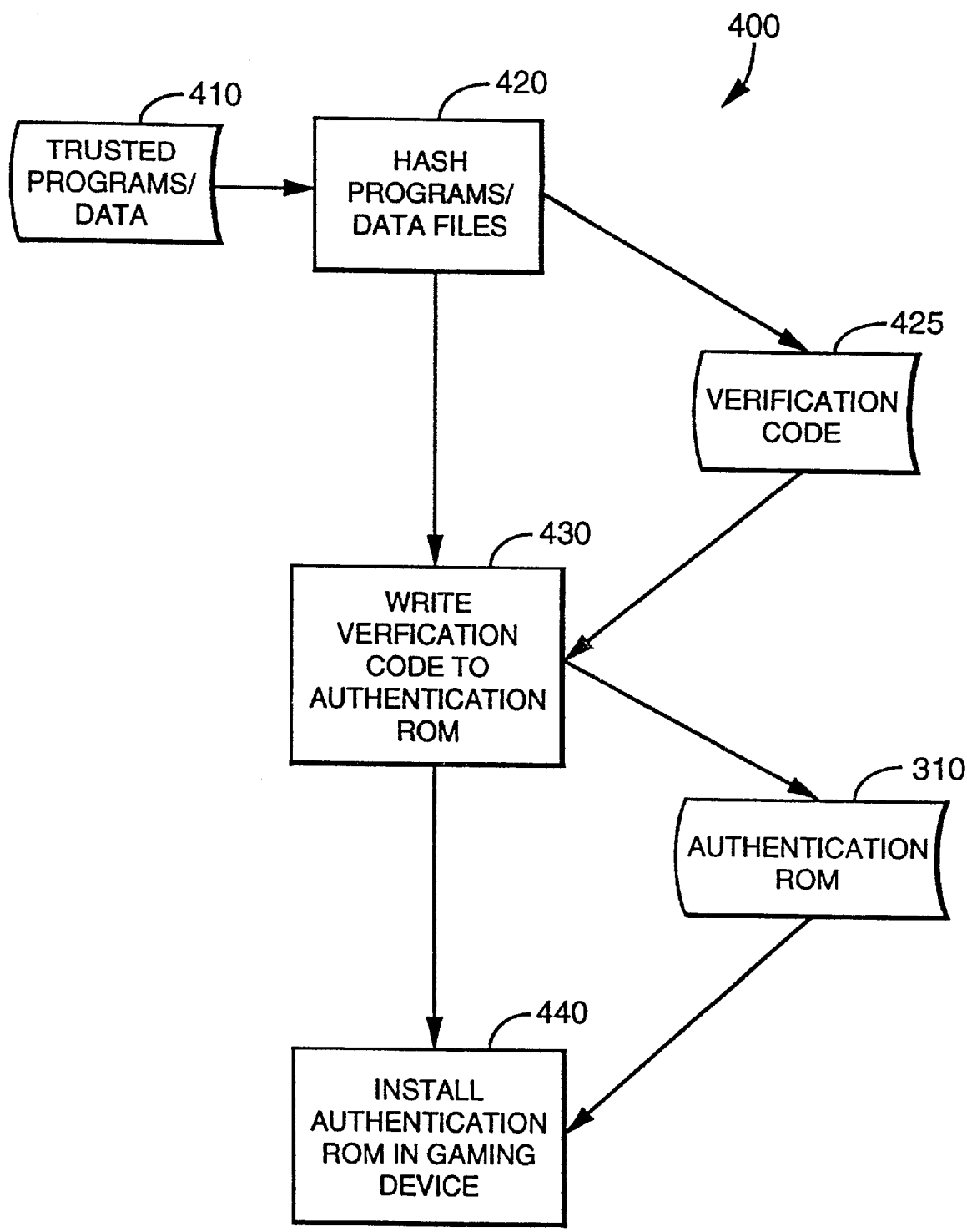
FIG. 4 is a flowchart of the preparation process according to one embodiment of the present invention.
Figure 5:
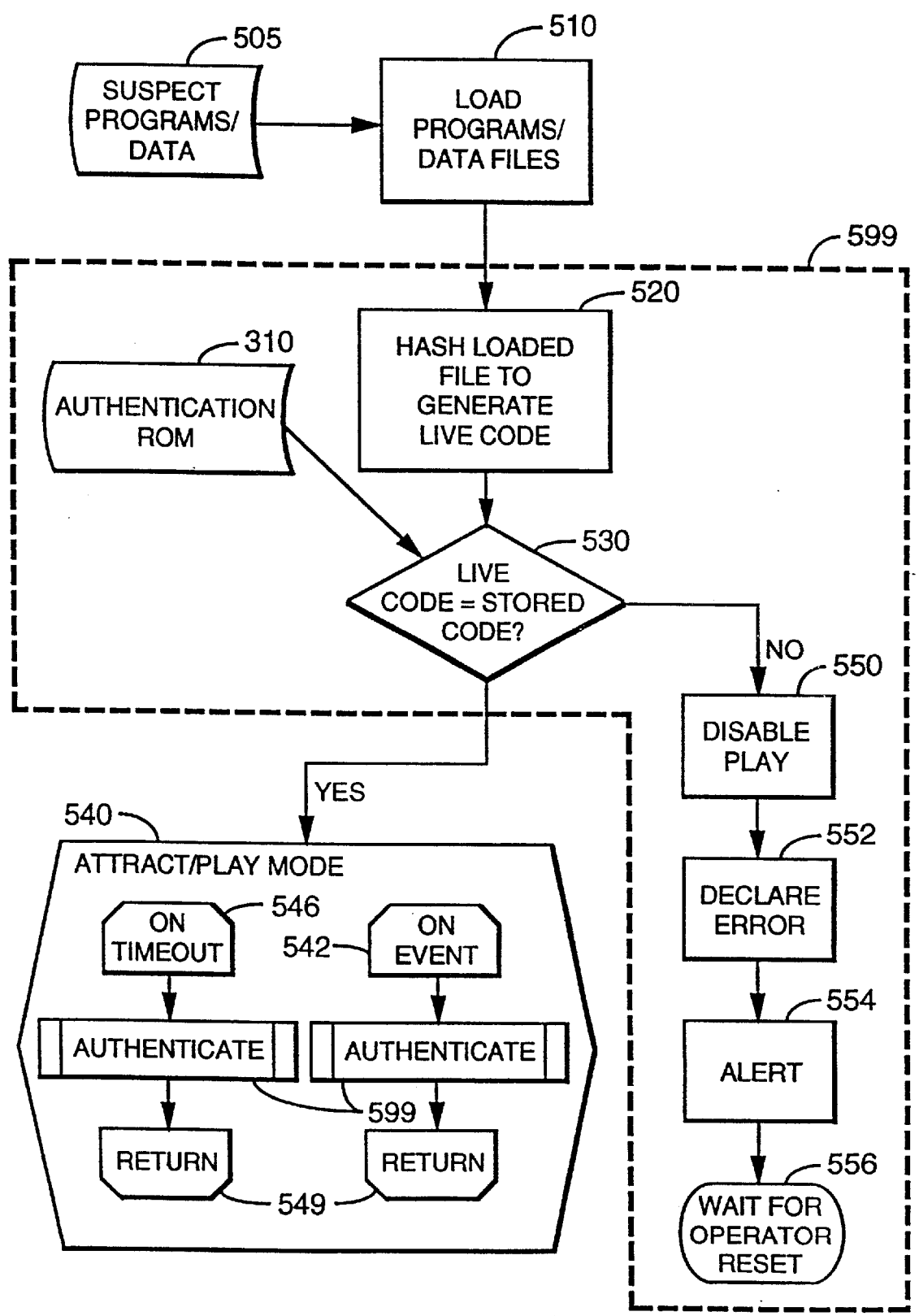
FIG. 5 is a flowchart of the attract/play mode process of one embodiment of the present invention.

The order in which the steps of FIGS. 4 and 5 are performed is purely illustrative in nature. In fact, the steps can be performed in any order or in parallel, unless otherwise indicated by the present disclosure.

On-Event and Watchdog Authentication

In some embodiments of the present invention, on the occurrence of any one or more of a set of pre-defined events 542, the entire authentication process 599 is repeated, returning 549 to attract/play mode 540 if all live codes match their corresponding stored codes in step 530. Such pre-defined events include, but are not limited to the following:

a) Receipt of an "All Doors Closed" signal b) Receipt of a "Tilt Cleared" signal c) Start of Play In some embodiments of the present invention, on the occurrence of a timeout 546, defined as the passage of a pre-determined time interval (e.g., 5 to 7 seconds) since the last performance of authentication process 599, a watchdog timer automatically initiates authentication process 599. A new set of live codes are generated for each and every file in RAM 330 and compared to the expected verification codes stored in authentication ROM 310, as described above.

In some embodiments, the watchdog timer is part of CPU 305. It may be implemented in either software or hardware by any of a number of conventional methods well-known in the art.

Alternate Embodiments

Although a verification process using all software program and related data files is described, those skilled in the art will realize that processes using less than all files can be used. For example, for the sake of faster processing, some verification testing of live codes (i.e., authentication process 599) may only be performed on the main game software program and a small subset of related files (such as pay tables and award displays). Such a configuration may be more desirable for the watchdog timer-initiated verification tests. Accordingly, the invention is not limited to any particular number of files to be verified.

Figure 6:
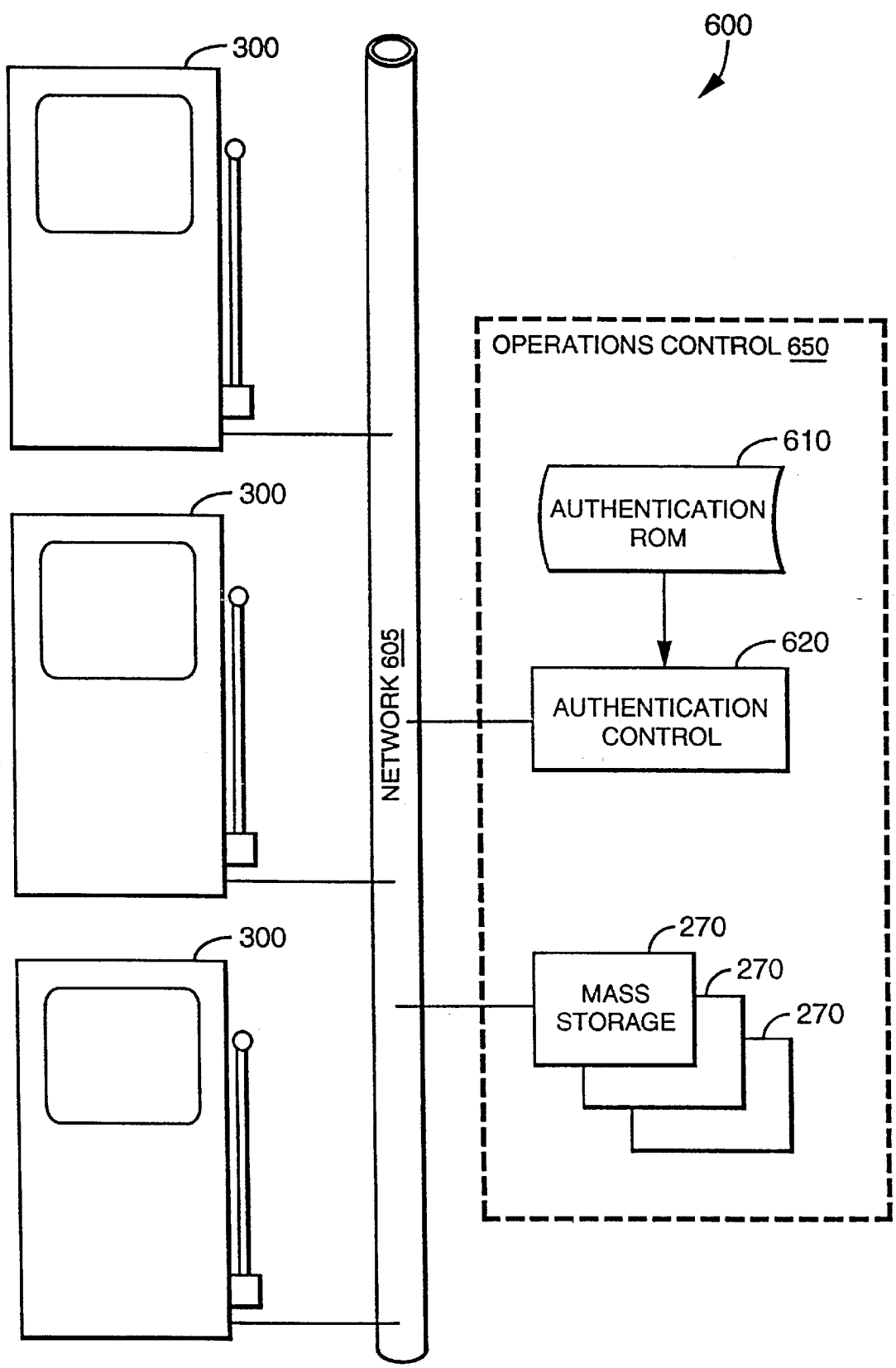
FIG. 6 is a high-level schematic of a networked authentication system according to one embodiment of the present invention.

Referring to FIG. 6, the software and/or hardware apparatus 600 implementing authentication process 599 may be located anywhere in the system of networked gaming devices 300, not only in each individual gaming machine. Thus, in a fully networked gaming system comprised of multiple gaming devices 300 and one or more centralized mass storage devices 270 connected together by secure network 605, authentication ROM 610 may be located in a central operations control area 650 in a secure facility or other such control station. In addition, authentication process 599 may run from an authentication control device 620 external to boot ROM 320 in each gaming device 300.

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

We claim:

1. A method of authenticating a suspect computer file in a gaming device comprising:
   computing a verification code for a trusted computer file containing a game program code or a game-related code external to said gaming device;
   storing said verification code in a first unalterable memory device in said gaming device, said game program code or said game-related code being stored in other than said first unalterable memory device;
   on loading of said suspect computer file into an alterable memory in said gaming device, computing a live code from said suspect computer file in said gaming device;
   comparing said live code to said verification code from said first unalterable memory device in said gaming device; and
   permitting operation of said suspect computer file if said live code is equal to said verification code.

2. The method of claim 1, wherein:
   said computing the verification code comprises hashing said trusted computer file; and
   said computing the live code comprises hashing said suspect computer file.

3. The method of claim 2, wherein said hashing uses a Panama hash code.

4. The method of claim 1, wherein said unalterable memory device comprises a read-only memory.

5. The method of claim 1, further comprising prohibiting play if the live code is not equal to the verification code.

6. The method of claim 5, further comprising alerting an operator.

7. The method of claim 1, further comprising:
   computing a second live code in said gaming device from said alterable memory on a designated event;
   comparing said second live code to said verification code; and
   permitting operation of said computer file if said second live code is equal to said verification code.

8. The method of claim 1, further comprising:
   computing a second live code in said gaming device from said alterable memory on elapse of a defined time interval;
   comparing said second live code to said verification code; and
   permitting operation of said computer file if said second live code is equal to said verification code.

9. The method of claim 1, wherein said verification code stored in said first unalterable memory is unencrypted.

10. An apparatus for authenticating a suspect computer file in a gaming device, comprising:
    circuitry external to said gaming device for computing a verification code for a trusted computer file containing a game program code or a game-related code;
    a first unalterable memory device in said gaming device adapted to being configured by said external circuitry to store said verification code and storing said verification code, said game program code or said game-related code being stored in other than said first unalterable memory device;
    circuitry in said gaming device for computing a live code from said suspect computer file on loading of said suspect computer file into an alterable memory in said gaming device; and
    circuitry in said gaming device for comparing said live code to said verification code from said first unalterable memory device and permitting operation of said suspect computer file if said live code is equal to said verification code.

11. The apparatus of claim 10, wherein:
    said circuitry for computing the verification code hashes said trusted computer file; and
    said circuitry for computing the live code hashes said suspect computer file.

12. The apparatus of claim 11, wherein said circuitry for computing said verification code and said circuitry for computing said live code use a Panama hash code.

13. The apparatus of claim 10, wherein said unalterable memory device comprises a read-only memory.

14. The apparatus of claim 10 wherein said circuitry for comparing further comprises circuitry prohibiting play if the live code is not equal to the verification code.

15. The apparatus of claim 14, wherein said circuitry for comparing further comprises circuitry alerting an operator.

16. The apparatus of claim 10, further comprising:
    circuitry for computing a second live code in said gaming device from said alterable memory on a designated event; and circuitry for comparing said second live code to said verification code stored in said unalterable memory device and permitting operation of said computer file if said second live code is equal to said verification code.

17. The apparatus of claim 10, further comprising:

circuitry for computing a second live code in said gaming device from said alterable memory on elapse of a defined time interval; and circuitry for comparing said second live code to said verification code stored in said unalterable memory device and permitting operation of said computer file if said second live code is equal to said verification code.

18. The apparatus of claim 10, wherein said verification code stored in said first unalterable memory is unencrypted.

19. A computer system for authenticating a suspect computer file in a gaming device, comprising computer instructions for:

computing a verification code for a trusted computer file containing a game program code or a game-related code external to said gaming device;

storing said verification code in a first unalterable memory device in said gaming device, said game program code or said game-related code being stored in other than said first unalterable memory device;

on loading of said suspect computer file into an alterable memory in said gaming device, computing a live code from said suspect computer file in said gaming device;

comparing said live code to said verification code from said first unalterable memory device in said gaming device; and permitting operation of said suspect computer file if said live code is equal to said verification code.

20. The computer system of claim 19, wherein:

said computing the verification code comprises hashing said trusted computer file; and said computing the live code comprises hashing said suspect computer file.

21. The computer system of claim 20, wherein said hashing uses a Panama hash code.

22. The computer system of claim 19, wherein said unalterable memory device comprises a read-only memory.

23. The computer system of claim 19, further comprising prohibiting play if the live code is not equal to the verification code.

24. The computer system of claim 23, further comprising alerting an operator.

25. The computer system of claim 19, further comprising:

computing a second live code in said gaming device from said alterable memory on a designated event;

comparing said second live code to said verification code; and permitting operation of said computer file if said second live code is equal to said verification code.

26. The computer system of claim 19, further comprising:

computing a second live code in said gaming device from said alterable memory on elapse of a defined time interval;

comparing said second live code to said verification code; and permitting operation of said computer file if said second live code is equal to said verification code.

27. The computer system of claim 19, wherein said verification code stored in said first unalterable memory is unencrypted.

28. A computer-readable storage medium, comprising computer instructions for:

computing a verification code for a trusted computer file containing a game program code or a game-related code external to said gaming device;

storing said verification code in a first unalterable memory device in said gaming device, said game program code or said game-related code being stored in other than said first unalterable memory device;

on loading of said suspect computer file into an alterable memory in said gaming device, computing a live code from said suspect computer file in said gaming device;

comparing said live code to said verification code from said first unalterable memory device in said gaming device; and permitting operation of said suspect computer file if said live code is equal to said verification code.

29. The computer-readable storage medium of claim 28, wherein:

said computing the verification code comprises hashing said trusted computer file; and said computing the live code comprises hashing said suspect computer file.

30. The computer-readable storage medium of claim 29, wherein said hashing uses a Panama hash code.

31. The computer-readable storage medium of claim 28, wherein said unalterable memory device comprises a read-only memory.

32. The computer-readable storage medium of claim 28, further comprising prohibiting play if the live code is not equal to the verification code.

33. The computer-readable storage medium of claim 32, further comprising alerting an operator.

34. The computer-readable storage medium of claim 28, further comprising:

computing a second live code in said gaming device from said alterable memory on a designated event;

comparing said second live code to said verification code; and permitting operation of said computer file if said second live code is equal to said verification code.

35. The computer-readable storage medium of claim 28, further comprising:

computing a second live code in said gaming device from said alterable memory on elapse of a defined time interval;

comparing said second live code to said verification code; and permitting operation of said computer file if said second live code is equal to said verification code.

36. The computer-readable storage medium of claim 28, wherein said verification code stored in said first unalterable memory is unencrypted.

* * * * *